United States Patent [19]

Roemer, Jr. et al.

[11] Patent Number: 5,197,884
[45] Date of Patent: Mar. 30, 1993

[54] QUESTION AND ANSWER GAME FOR STIMULATING INTEREST IN NEWS PERIODICALS

[75] Inventors: James W. Roemer, Jr., East Berne; Paul V. Tymchyn, Altamont, both of N.Y.

[73] Assignee: Tymroe Venture Partners, Albany, N.Y.

[21] Appl. No.: 699,603

[22] Filed: May 14, 1991

[51] Int. Cl.[5] .......................................... G09B 17/00
[52] U.S. Cl. .................................... 434/178; 434/167; 273/430; 273/429; 283/56
[58] Field of Search ............... 434/177, 167, 128, 178; 273/429, 430, 431, 432; 283/903, 56

[56] References Cited

U.S. PATENT DOCUMENTS

| | | | |
|---|---|---|---|
| 1,599,460 | 9/1926 | Craze | 283/56 |
| 4,090,717 | 5/1978 | Rossetti | 273/249 |
| 4,506,913 | 3/1985 | Kim | 283/56 |
| 4,586,707 | 5/1986 | McNeight et al. | 273/430 |
| 4,619,457 | 10/1986 | Small | 273/269 |
| 4,657,248 | 4/1987 | Benaim | 273/432 |
| 4,736,954 | 4/1988 | Haney et al. | 273/236 |
| 4,966,366 | 10/1990 | Mercado-Torres | 273/458 |
| 5,018,975 | 5/1991 | Todd | 434/177 X |

OTHER PUBLICATIONS

Washington Post, Mar. 14, 1991 edition "Classified Quest".

Primary Examiner—J. Wilson
Assistant Examiner—Jeffrey A. Smith
Attorney, Agent, or Firm—Shlesinger, Arkwright & Garvey

[57] ABSTRACT

A preferred embodiment of the present invention is directed to a question and answer game for stimulating interest in commercial publications. The question and answer game includes a news periodical having a plurality of sections. At least one question is formed integral with the news periodical. The question is formulated such that the answer is found in an actual article appearing in the news periodical. An answer form is also integral with the news periodical. The answer form includes a first section for recording the answer to the at least one question appearing in the news periodical. The answer form further includes a second section for recording the location where the answer was found.

31 Claims, 4 Drawing Sheets

FIG. 4

SUNDAY'S NEWSBEAT GAME QUESTIONS | LETTER EARNED

| | Question | |
|---|---|---|
| N | Name the material used in bullet-resistant vests. | N |
| E | Name the USA's largest discount stock brokerage firm. | E |
| W | Who is Carlos Salinas de Gortari ? | W |
| S | What do the initials F.H.L.M.C. represent ? | S |
| B | He won an Oscar for his role in "Tender Mercies." | B |
| E | Calcutta is the Capital of what country ? | E |
| A | This American painter's museum is in Stockbridge, Massachusetts. | A |
| T | What major professional golf tournament is played in Georgia ? | T |

SUNDAY'S NEWSBEAT GAME ANSWERS

| | Answers | Page Designation | |
|---|---|---|---|
| N | Kevlar | B-4 | N |
| E | Charles J. Schwab | F-7 | E |
| W | Mexican President | A-6 | W |
| S | Federal Home Loan Mortgage Corp | C-5 | S |
| B | Robert DuVall | H-1 | B |
| E | India | A-4 | E |
| A | Norman Rockwell | C-2 | A |
| T | The Masters | B-5 | T |

QUESTION AND ANSWER GAME FOR STIMULATING INTEREST IN NEWS PERIODICALS

FIELD OF THE INVENTION

The present invention is directed to method and apparatus for stimulating interest in commercially distributed publications. More specifically, a preferred embodiment of the present invention is directed to a question and answer game, one purpose of which is to motivate individuals and commercial entities to read and advertise in newspapers and other related commercial publications.

BACKGROUND OF THE INVENTION

Corporations and other business entities which distribute commercial publications in general, and newspapers in particular have experienced a decline in profitability resulting from a lack of interest on the part of the consumers. The cause of the economic decline experienced by corporations in the commercial publication industry is readily apparent. Specifically, consumers' ambivalence or disinterest in commercial publications has translated directly to poor circulation and low revenues derived therefrom. Furthermore, a drop-off in circulation inevitably results in advertisers seeking other mediums in which to convey their products and/or services to consumers. It is widely accepted in the industry that advertising fees form by far the major source of revenue for business entities in the publication industry. Thus, these entities cannot afford to loose advertisers. Rather, it is necessary for them to enlarge their advertising clientele to remain competitive in the industry.

It is readily apparent from the above discussion that circulation is tantamount to survival in the commercial publication industry.

Lack of interest in commercial publications such as newspapers and the like also adversely affects the public at large. More specifically, a substantial percentage of students at all levels have shown little interest in reading publications of any type, including newspapers, on a regular basis. On the contrary, todays students have become more and more dependent upon the television for entertainment. As a result, students reading skills in general and reading comprehension in particular have suffered dearly. Moreover, students have demonstrated a minimal understanding of current events at home and abroad. The same holds true for the general knowledge of current events and reading skills of adults.

Therefore, the commercial publication industry is sorely in need of method and apparatus for stimulating interest in newspapers and related publications.

OBJECT AND SUMMARY OF THE INVENTION

An object of the present invention is to provide method and apparatus for stimulating consumer interest in commercial publications such as newspapers, magazines and the like.

Another object of the present invention is to provide method and apparatus for motivating consumers to read commercial publications such as newspapers, magazines and the like in their entirety.

A further object of the present invention is to provide method and apparatus for improving reading skills of students and adults.

Yet another object of the present invention is to provide method and apparatus for improving knowledge of students and adults relating to current events at home and abroad.

Yet a further object of the present invention is to provide method and apparatus for directing a reader's attention to specific news or advertising articles appearing in commercial publications.

Still a further object of the present invention is to provide method and apparatus which encourages advertisement in commercial publications such as newspapers, magazines and the like.

Another object of the present invention is to provide a question and answer game which includes questions formulated such that the answers are found in actual advertising or news articles in commercial publications thereby requiring an individual to read the same.

A further object of the present invention is to provide a question and answer game which requires players to designate the location in the commercial publication at which the answer appears thereby insuring that the player did not obtain the answer from a collateral source.

Still a further object of the present invention is to provide a question and answer game where at least some questions are formulated such that the answers can be found in only a particular issue of a commercial publication.

Yet a further object of the present invention is to provide a question and answer game where at least some of the questions are formulated such that the answers can be found in a number of issues of a commercial publication.

Yet still another object of the present invention is to provide a question and answer game where the questions are the sole means by which a player is directed to the section of the commercial publication having the answer thereby requiring a player to review substantial portions thereof.

A further object of the present invention is to provide a question and answer game which directs the player to a number of different sections of the newspaper.

In summary, a preferred embodiment of the present invention is directed to a novel and unobvious question and answer game for stimulating interest in commercial publications. The question and answer game includes a news periodical having a plurality of sections. At least one question is formed integral with the news periodical. The question is formulated such that the answer is found in an actual article appearing in the news periodical. An answer form is also integral with the news periodical. The answer form includes a first section for recording the answer to the at least one question appearing in the news periodical. The answer form further includes a second section for recording the location in the newspaper where the answer was found.

These objects and advantages of the preferred embodiments of the present invention as well as others will be readily apparent from a review of the specification, drawings and claims.

DETAILED DESCRIPTION OF THE DRAWINGS

FIG. 4 is an enlarged view of the broken away portion in FIG. 3.

DETAILED DESCRIPTION OF THE INVENTION

The preferred embodiments of the present invention Will be described with reference made to FIGS. 1 through 4.

FIGS. 1 AND 2

The first embodiment of the present invention will be described in connection with FIGS. 1 and 2.

Figures 1, 2A, 2B, 2C, 2D:
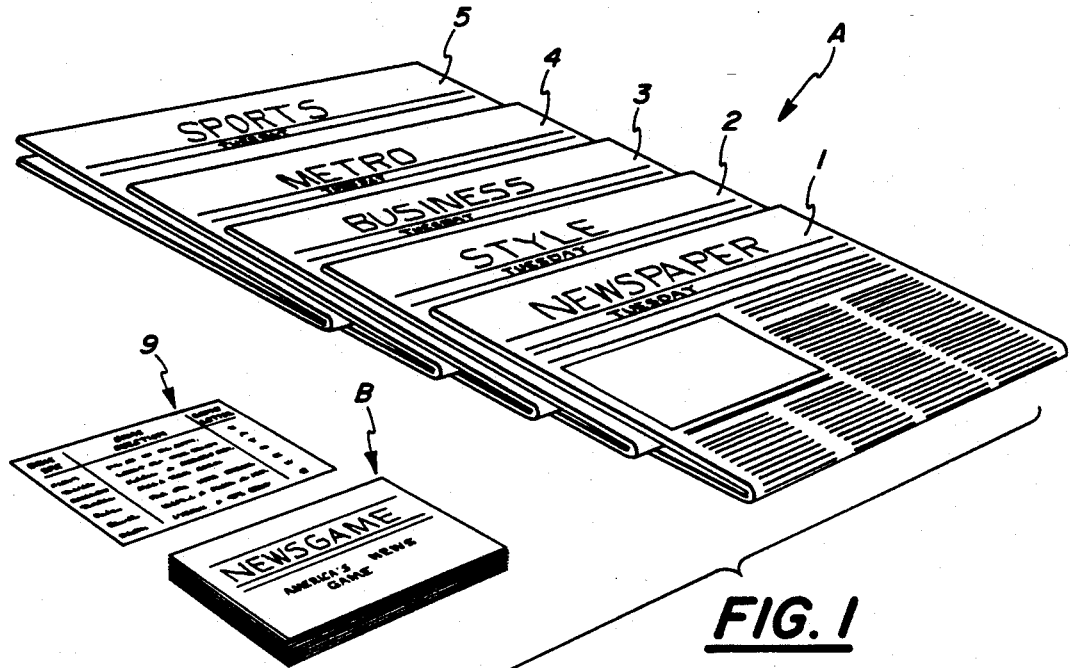
FIG. 1 is a perspective view of the components of a first embodiment of the present invention.
FIGS. 2a through 2d are a plan view of the various game cards of the first embodiment of the present invention.

Referring to FIG. 1, the components of the first embodiment are illustrated therein. More specifically, the first embodiment includes a newspaper A and a plurality of game cards B. Although a newspaper is illustrated as being one of the components of the first embodiment of the present invention, it will be readily appreciated that other commercial publications may be substituted therefor. For example, magazines of virtually any kind would be suitable for the question and answer game of the present invention. As is conventional, newspaper A is comprised of a plurality of sections including a front page section 1, a style section 2, a business section 3, a metro section 4 and a sports section 5. It will be readily appreciated that the newspaper A may be comprised of one or more of these sections or may include other sections such as a classified section, real estate section or an editorial section. In other words, any conventional newspaper may be used.

Preferably, there are 53 game cards B. Referring to FIGS. 2a through 2d, examples of the various game cards are illustrated therein. More specifically, referring to FIG. 2a the game cards B include one team start card 6 which, when drawn, commences the game. Further, the game cards B include two collection cards 7 of the type illustrated in FIG. 2b and a bonus card 8 of the type illustrated in FIG. 2c. The remaining forty-eight game cards B are question cards 9 of the type illustrated in FIGS. 2d and 2e.

Preferably, each question card 9 is subdivided into sections 10, 11 and 12. Section 10 has the heading GAME DAY and lists therebelow each day of the week. Section 11 has the heading GAME QUESTION and lists thereunder one question for each day of the week. Section 12 has the heading GAME LETTER and includes a letter of the alphabet associated with each question listed in section 11. Preferably, thirty-two of the forty-eight question cards have letters listed in Section 12 of a first color such as blue and the remaining sixteen question cards have letters of a second color such as red. The different colored letters identify the difficulty of the questions.

Figure 2E:
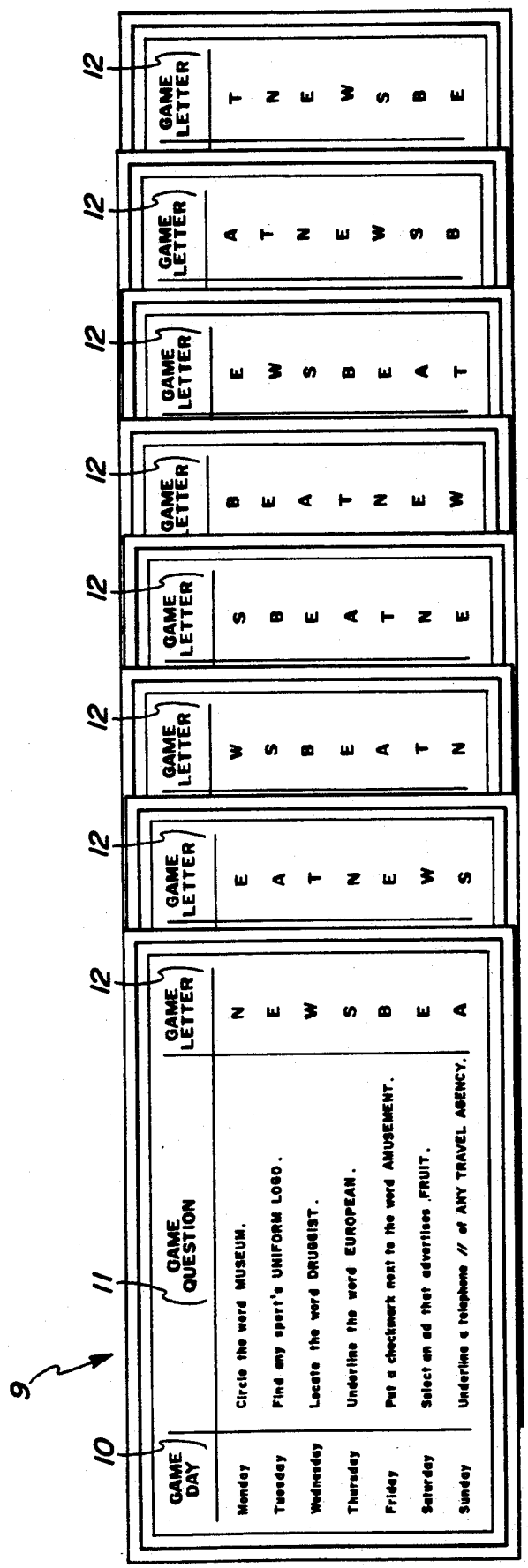
FIG. 2e is a plan view of a typical set of question cards.

The thirty-two blue letter question cards are subdivided into four sets each having eight question cards. A typical set of question cards is illustrated in FIG. 2e. Each set is arranged such that the eight letters associated with each game day spell out the word NEWSBEAT, as shown in FIG. 2e. For example, the eight letters associated with the game day Monday (for the set illustrated in FIG. 2e) spell out the word NEWSBEAT in order. The same holds true for the remaining days of the week. However, the eight letters spelling NEWSBEAT for the remaining days of the week do not appear in order.

The sixteen red letter game cards are subdivided into two sets of eight question cards. Each set is arranged such that the letters associated with each game day spell out the word NEWSBEAT in the same manner as the set illustrated in FIG. 2e.

The preferred manner of playing the question and answer game of the first embodiment of the present invention will be described hereinafter.

The players may agree as to the "game day", i.e. which issue of the newspaper will be used. Alternatively, some means may be provided for determining the "game day". For example, a multi-sided die having a different day of the week printed on each side may be provided. A player from a particular team would then roll the die to determine which issue of the newspaper is to be used. All sections of the selected issue of a newspaper are compiled and positioned on the designated playing area. For purposes of illustration only, the Tuesday edition of the newspaper has been chosen, as shown in FIG. 1. The fifty-three playing cards B are shuffled and are turned face down. As seen in FIG. 1, when the playing cards B are turned face down the name of the game appears on the other side thereof with any slogan that may be desired. Preferably, the players are divided into two teams. Any number of players may be on a particular team. One player of one of the teams deals the cards face up until one team receives the team start card 6. The remaining game cards B are positioned in a stack face down.

The team which drew the team start card 6 gets the choice of drawing a card or having their opponents do so. Assuming that the team receiving the team start card 6 wishes to go first, they draw a card from the stack of game cards B. If a question card is drawn, then that team tries to answer the Tuesday question from the Tuesday edition of the newspaper. Thus, the team searches through and reads the various sections of the Tuesday edition to find the answer for that days question. A time limit is placed on the team in which they must find the answer to the question. Preferably, a team is given approximately two minutes to answer the question. If the team is successful in answering the question, they hold onto the question card to make record of the game letter acquired. The letter will be one of the letters in the word NEWSBEAT. If the answer is not found, the card is placed on the bottom of the pile and no letter is recorded for that particular team.

Regardless of whether the answer is found or not, the other team subsequently draws a card. If a question card is drawn the team tries to answer the question associated with the game day Tuesday in the same manner as described above. The first team to spell out the word NEWSBEAT using eight separate game cards wins.

Should one of the teams draw either of the two collections cards 7, they may choose a letter from the opposing team's NEWSBEAT spelling. The bonus card 8, when drawn, permits that team to request a different game day.

Since there are six different sets of game cards B, six separate spellings of NEWSBEAT are present. Thus, a team may draw a question having a letter of NEWSBEAT associated therewith which they already have. The team will still wish to answer the question correctly in the event their opponent should draw a collection card. However, due to the multiple spellings of NEWSBEAT, it may be necessary for a team to answer more than eight questions.

Preferably, there are three winning classifications: (1) Publishers' Club—spelling of NEWSBEAT with all red letters; (2) Editors' Club—spelling of NEWSBEAT with all blue letters; and, (3) Reporters' Club—spelling of NEWSBEAT with a combination of red or blue letters.

The questions listed in section 11 of each of the forty-eight question cards 9 are of a general nature such that the answer will be found in any issue of the newspaper. For example, as seen in FIG. 2d, the question associated with the game day Wednesday is "Underline an Association Word". The answer to this particular question can be found in virtually any edition of the newspaper. The questions in each set of question cards 9 for a particular issue are formulated in such a manner that a player is directed to a number of different sections of the newspaper. Thus, by playing the game the players read virtually the entire paper thereby improving their reading comprehension skills and knowledge of current events.

Further, the random nature in which articles appear in the newspaper requires the players to review a substantial portion thereof. More specifically, news articles and advertising articles (except in the classified section) do not generally appear in alphabetical or chronological order. Therefore, a player cannot simply turn to the desired area of the newspaper. Moreover, because the content of the questions appearing in section 11 is the only means by which the player is directed to the answer in the newspaper, it is necessary for the player to review and read a great number of articles.

It will be readily appreciated that separate editions of the game may be provided for adults and children. Of course, the questions for the children's edition would be considerably easier than the adult's edition.

FIGURES 3 AND 4

A second preferred embodiment of the present invention will be described with reference made to the above-identified figures.

Figure 3:
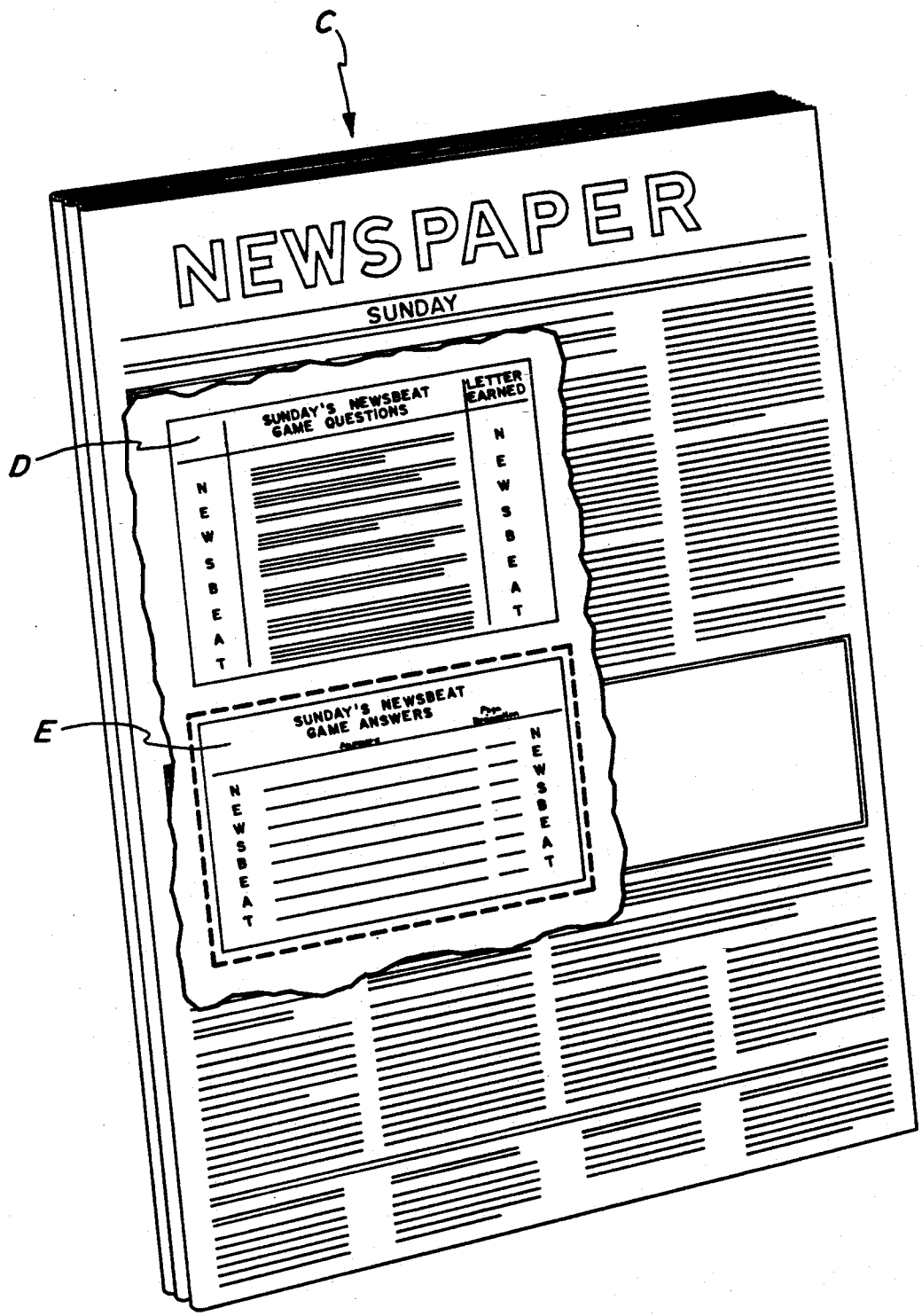
FIG. 3 is a perspective view of a second embodiment of the present invention with a portion thereof broken away.

Referring to FIG. 3, a conventional newspaper C is illustrated therein. A portion of the newspaper C is broken away to reveal a page having printed thereon a NEWSBEAT game question listing D and a NEWSBEAT answer form E. Referring to FIG. 4, the NEWSBEAT game question listing D and answer form E are enlarged for a better appreciation thereof. A portion 13 of listing D, includes eight questions for the Sunday edition of the newspaper. Portion 14 of listing D identifies eight letters forming the word NEWSBEAT, one letter being associated with each question.

The questions listed in portion 13 are preferably formulated such that the answers are found in actual news or advertising articles appearing in the newspaper. Thus, the player must read the articles to find the answers to the questions. Furthermore, it is desirable to formulate the eight questions such that at least some of the questions direct the game player to different sections of the paper so that the player must review the newspaper in its entirety. As opposed to the first embodiment, the questions of the second embodiment may be formed specific to a particular edition of the newspaper. Preferably, symbols or other search aids, other than the content of the questions themselves, are not used to assist the player in locating the answers. This feature of the present invention helps to ensure that the player will thoroughly read the newspaper.

The answer form E has a portion 15 where the player is to record the answers to the eight questions listed in portion 13 of section D. Also, form E includes a page designation portion 16 which requires the game player to record the page at which he or she found the answer to the particular question. This feature ensures that the player has obtained the answer from his or her review of the newspaper rather than some other collateral source of information. A weakness line 17 borders the answer form E to permit a player to detach the same from the newspaper.

It will be readily appreciated that the number of questions may be varied as desired. Furthermore, any word may be chosen to be spelled out by the player. It is readily apparent that the questions and letters associated therewith spelling out the particular word may appear consecutively in a number of different issues rather than in a single issue. Moreover, the question and answer game of the present invention does not require the spelling of a particular word. Although this embodiment has been described as a game which is played on a daily basis, it can be played over any particular time interval.

The newspaper can provide numerous different incentives to consumers to encourage them to play the game.

While this invention has been described as having a preferred design, it is understood that it is capable of further modifications, uses and/or adaptions of the invention following in general the principle of the invention including such departures from the present disclosure as come within the known or customary practice in the art to which the invention pertains, and as may be applied to the central features set forth and fall within the scope of the invention and the limits of the appended claims.

We claim:

1. A question and answer game for stimulating interest in news periodicals, comprising:
   a) news periodical having at least one section, said at least one section including a plurality of printed indicia therein; and,
   b) inquiry means for causing an individual to review at least a portion of said at least one section of said news periodical, said inquiry means including a plurality of questions, the answer to which is found in the printed indicia in said at least one section; and,
   c) at least one letter of a game winning answer is associated with each of said plurality of questions, said at least one letter being independent of the answer to said plurality of questions.

2. A question and answer game as in claim 1, wherein:
   a) said inquiry means is integral with said news periodical.

3. A question and answer game as in claim 2, further including:
   a) an answer form means for recording an answer to said plurality of questions, said answer form means is integral with said news periodical.

4. A question and answer game as in claim 3, wherein:
   a) said answer form means includes a section for designating at what location in said news periodical the answer to said was found.

5. A question and answer game as in claim 3, wherein:
   a) said answer for means includes a section for designating page number of said news periodical where the answer to said plurality of questions was found.

6. A question and answer game as in claim 2, wherein:
a) answer form means is integral with said news periodical, said answer form means includes a first section for printing answers to said plurality of questions and a second section for printing page numbers of said news periodical where the answers were found.

7. A question and answer game as in claim 1, wherein:
a) said inquiry means is separate from said news periodical.

8. A question and answer game as in claim 1, wherein:
a) said plurality of printed indicia of said at least one section form a plurality of news and advertising articles;

9. A question and answer game as in claim 1, wherein:
a) said plurality of printed indicia of said at least one section form a plurality of news and advertising articles, said plurality of news and advertising articles are randomly organized.

10. A question and answer game as in claim 1, wherein:
a) said news periodical includes a plurality of sections; and,
b) said inquiry means includes at least two questions, the answer to each of which are found in different sections of said news periodical.

11. A question and answer game as in claim 1, wherein:
a) said plurality of questions are the sole means for causing an individual to review said at least a portion of said at least one section of said news periodical having said answer.

12. A method of stimulating individuals to review articles appearing in news periodicals, comprising the steps of:
a) providing news periodicals having at least one section including advertising and news articles;
b) providing inquiry means for causing an individual to review at least one section of the news periodical, the inquiry means including at least one question;
c) formulating the at least one question such that the answer is found in one of the advertising and news articles; and,
d) providing an answer form in the at least one section of the news periodical, the answer form having an answer blank for the player to record the location of the news periodical where the answer to the at least one question was found.

13. A method as in claim 12, including the further step of:
a) providing the at least one question in the at least one section of the news periodical.

14. A method as in claim 13, including the further step of:
a) formulating the questions specific to a particular issue of the news periodical.

15. A method as in claim 12, further including the step of:
a) providing the at least one question separate from the news periodical.

16. A method as in claim 15, further including the step of:
a) formulating the at least one question generally such that an answer may be found in a plurality of issues of the news periodical.

17. A method as in claim 12, further including the step of:

a) providing a plurality of questions; and,
b) associating a letter with each of the plurality of questions such that by answering each question correctly an individual forms a word with the letters associated with each of the questions.

18. A question and answer game for stimulating interest in news periodicals, comprising:
a) news periodical having at least one section including advertising and news articles;
b) inquiry means for causing an individual to review at least a portion of said at least one section of said news periodical, said inquiry means including at least one question, the answer to which is found in one of said advertising and news articles;
c) said at least one question is integral with said news periodical; and,
d) an answer form means for recording an answer to said at least one question, said answer form means being integral with said news periodical and having an answer blank for a player to record a location of said news periodical where the answer was found.

19. A question and answer game as in claim 18, wherein:
a) said advertising and news articles are randomly organized.

20. A question and answer game as in claim 18, wherein:
a) said news periodical includes a plurality of sections; and,
b) said inquiry means includes a plurality of questions, the answer to each of which are found in different sections of said news periodical.

21. A question and answer game as in claim 20, wherein:
a) at least one letter is associated with each of said plurality of questions such that by answering each question correctly said letters spell out a word.

22. A question and answer game as in claim 18, wherein:
a) said at least one question is the sole means for causing an individual to review said advertising and news articles where the answer is found.

23. A question and answer game for stimulating individuals to review articles appearing in new periodicals, comprising:
a) plurality of game cards, said plurality of game cards includes at least one question card;
b) said at least one question card includes at least first, second and third sections;
c) said first section includes at least one question, the answer to which is found in a news periodical;
d) said second section includes a designating means for designating a particular issue of the news periodical where the answer must be found; and,
e) said third section includes a letter associated with said at least one question, said letter being independent of the answer to said at least one question.

24. A question and answer game as in claim 23, wherein:
(a) said designating means includes a listing of each day of the week; and,
b) said first section includes a question for each day of the week.

25. A question and answer game as in claim 24, wherein:
a) said plurality of game cards include a bonus card permitting a player to designate which day of the week the answers must be found.

26. A question and answer game as in claim 25, wherein:
 a) said third section includes a letter associated with each of said questions listed in said first section.

27. A question and answer game as in claim 23, wherein:
 a) said plurality of game cards include a plurality of question cards each having said first, second and third sections;
 b) said second section of each of said plurality of question cards lists each day of the week;
 c) said first sections of each of said plurality of question cards includes a question for each day of the week; and
 d) said third sections of each of said plurality of question cards includes a letter for each question listed in said first section.

28. A question and answer game as in claim 27, wherein:
 a) said letters of said third sections of said plurality of question cards spell out a word.

29. A question and answer game as in claim 28, wherein:
 a) said letters of said third section of at least one question card have a color different from at least one other question card.

30. A question and answer game as in claim 29, wherein:
 a) said plurality of game cards includes at least one challenge card permitting a player to select a letter from his opponent.

31. A question and answer game for stimulating interest in news periodicals, comprising:
 a) news periodical having at least one section, said at least one section including a plurality of printed indicia therein; and,
 b) inquiry means for causing an individual to review at least a portion of said at least one section of said news periodical, said inquiry means consisting of a plurality of questions, the answer to which is found in the printed indicia in said at least one section, each of said plurality of questions being free from indicia which identify to the player the location in said at least one section where the answer can be found.

* * * * *